US012596662B2

(12) United States Patent  
Matthies et al.

(10) Patent No.: US 12,596,662 B2  
(45) Date of Patent: Apr. 7, 2026

(54) METHOD FOR INTEGRATING INTO A DATA TRANSMISSION A NUMBER OF I/O MODULES CONNECTED TO AN I/O STATION, STATION HEAD FOR CARRYING OUT A METHOD OF THIS TYPE, AND SYSTEM HAVING A STATION HEAD OF THIS TYPE

(71) Applicant: Phoenix Contact GmbH & Co. KG, Blomberg (DE)

(72) Inventors: Thorsten Matthies, Barntrup (DE); Stefan Pollert, Espelkamp (DE); Klaus Wessling, Bückeburg (DE); Carsten Henning, Schieder-Schwalenberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 72 days.

(21) Appl. No.: 18/276,333

(22) PCT Filed: Feb. 7, 2022

(86) PCT No.: PCT/EP2022/052903  
§ 371 (c)(1),  
(2) Date: Aug. 8, 2023

(87) PCT Pub. No.: WO2022/171575  
PCT Pub. Date: Aug. 18, 2022

(65) Prior Publication Data  
US 2024/0111696 A1 Apr. 4, 2024

(30) Foreign Application Priority Data  
Feb. 10, 2021 (LU) .................................. LU102517

(51) Int. Cl.  
*G06F 13/20* (2006.01)

(52) U.S. Cl.  
CPC .................................... *G06F 13/20* (2013.01)

(58) Field of Classification Search  
None  
See application file for complete search history.

(56) References Cited

U.S. PATENT DOCUMENTS 6,912,678 B1 * 6/2005 Floro ..................... G01R 31/67  
714/724  
7,228,363 B1 6/2007 Wehrle et al.  
(Continued)

FOREIGN PATENT DOCUMENTS

EP 3054385 A1 8/2016  
WO 2007/149688 A2 12/2007  
WO 2008/121574 A2 10/2008

OTHER PUBLICATIONS

Authorized Officer: Kuntz, Jean-Marc, International Search Report issued in PCT Application No. PCT/EP2022/052903, May 20, 2022, 2 pp.  
(Continued)

*Primary Examiner* — Henry Tsai  
*Assistant Examiner* — Christopher A Bartels  
(74) *Attorney, Agent, or Firm* — Kaplan Breyer Schwarz, LLP

(57) ABSTRACT

A method for integrating into a data transmission a number of I/O modules connected to an I/O station in accordance with a configuration for processing data assignable in accordance with this configuration, includes activating an integration mode, checking whether a target configuration for connecting a number of I/O modules to the I/O station for processing primary data is stored in a memory, checking whether the target configuration can be found on the basis of analyzed connected I/O modules, assigning each I/O module required for finding the target configuration to the target configuration, assigning each I/O module not required for (Continued)

finding the target configuration, to a new configuration for processing data, operating the I/O station with each I/O module assigned to the target configuration in accordance with the target configuration, and operating the I/O station with each I/O module assigned to the new configuration independently of and/or in addition to the target configuration in accordance with the new configuration for processing data assignable in accordance with this new configuration independently of the target configuration. Further, a station head for carrying out the method and a system including the station head.

13 Claims, 2 Drawing Sheets

(56)                    References Cited

U.S. PATENT DOCUMENTS

| 9,170,578 | B2 * | 10/2015 | Lessmann | G05B 19/0423 |
| 9,588,503 | B2 * | 3/2017 | Cooper | G06F 3/067 |
| 11,232,058 | B2 * | 1/2022 | Jen | H04L 69/161 |
| 11,256,641 | B2 * | 2/2022 | Chandhoke | G06F 13/368 |
| 2008/0111581 | A1 | 5/2008 | Wong et al. | |
| 2009/0077270 | A1 | 3/2009 | Chen et al. | |
| 2012/0060044 | A1 * | 3/2012 | Jonsson | H01R 13/6683 |
| | | | | 713/340 |
| 2015/0261449 | A1 | 9/2015 | Mitra et al. | |
| 2015/0278144 | A1 | 10/2015 | McLaughlin et al. | |
| 2016/0204608 | A1 * | 7/2016 | Ewing | H05K 7/1492 |
| | | | | 307/38 |
| 2017/0168883 | A1 | 6/2017 | Ratilla et al. | |
| 2018/0349235 | A1 * | 12/2018 | Freydel | G06F 11/182 |
| 2021/0019138 | A1 | 1/2021 | Gorka et al. | |
| 2021/0208572 | A1 * | 7/2021 | Hilpert | G05B 19/4185 |
| 2021/0341907 | A1 * | 11/2021 | Fadul | G06F 13/20 |

OTHER PUBLICATIONS

Search Report and Written Opinion issued in Luxembourg Application No. LU102517, Oct. 26, 2021, 10 pp.
Authorized Officer: Nora Lindner, English Translation of the International Preliminary Report on Patentability issued in PCT Application No. PCT/EP2022/052903, Aug. 15, 2023, 8 pp.
Examiner Jean-Marc Kuntz, Communication issued in related European Patent Application No. 22707656.9 on Jan. 20, 2026 and English Translation thereof.
Office Action and English Translation thereof, issued in related Chinese Patent Application No. 202280010463.9 on Sep. 26, 2025.

* cited by examiner

METHOD FOR INTEGRATING INTO A DATA TRANSMISSION A NUMBER OF I/O MODULES CONNECTED TO AN I/O STATION, STATION HEAD FOR CARRYING OUT A METHOD OF THIS TYPE, AND SYSTEM HAVING A STATION HEAD OF THIS TYPE

FIELD

The invention relates to a method for integrating into a data transmission a number of I/O modules connected to an I/O station, as well as a station head for such an I/O station and a system comprising such a station head.

BACKGROUND

It is known from the prior art that field devices such as measuring sensors or actuators are connected for the purpose of communication with a higher-level automation device, e.g. a programmable logic controller "PLC", via a communication bus, in particular a field bus, such as Profibus, or Industrial Ethernet, such as Profinet. In detail, the various field devices of a plant are initially directly connected to individual input/output modules "I/O modules", which are connected and interconnected according to a specific configuration within an input/output station "I/O station" or also several such I/O stations, so that the field devices are consequently also connected to such an I/O station via these I/O modules. The interconnection within the I/O station is usually initially carried out via a so-called backplane bus. The I/O station is then in turn connected to the higher-level automation device via the communication bus. For this purpose, the I/O station usually has a station head, e.g. in the form of a bus coupler or a decentralized controller, which is used for communication to and from the I/O station, including the associated organization between the communication bus and the backplane bus. The process data coming from the field devices in the plant receiving input signals, and thus originating from a process to be automated, are conventionally transmitted cyclically via the station head of the I/O station by means of the communication bus to the automation device, if necessary together with further data influencing the automation of this process, in particular data of the I/O station to be transmitted acyclically, e.g. with diagnostic data. Similarly, the process data that are sent to the field devices in the plant that output signals and consequently influence the process to be automated are conventionally received cyclically by the automation device via the station head of the I/O station by means of the communication bus and are forwarded to the field devices connected to the I/O station, if necessary together with other data that influence the automation of this process, in particular data to be transmitted acyclically. These data and their processing can thus also directly influence each other in terms of content and topicality.

Such data, which can be assigned to a common process and exchanged with an automation device intended for its automation, i.e. as a rule cyclic data and possibly acyclic data of an I/O station, which can directly influence each other with regard to content and topicality, are referred to in the following as primary data. In addition to this, in some cases a supplementary or alternative, often parallel data transmission also takes place—via another communication channel with another higher-level device, whereby the data of such a supplementary or alternative data transmission is to be available for supplementary or alternative processing independently and without direct influence on the content and topicality of the first-mentioned data, i.e. the mutually influencing data, and is therefore also referred to below as secondary data. The secondary data can be assigned here to the same process but also to another process, however, an additional I/O station must be used for this as a rule, which has other I/O modules connected and interconnected within this additional I/O station according to a certain configuration. OPC UA (Open Platform Communications Unified Architecture), for example, can be used as a communication channel for the supplementary or alternative data transmission of the secondary data, which sometimes takes place in parallel.

In particular, before commissioning an I/O station, a target configuration of the I/O station is conventionally projected in an engineering software. As explained above, the data that can be assigned to a common process according to the target configuration and its processing can also directly influence each other with regard to content and topicality. During commissioning, the target configuration is compared with an actual configuration, i.e. with the specific configuration according to which the I/O modules are connected and interconnected within the I/O station. It is possible that the I/O station can be put into operation even if there is a deviation between the target and actual configuration. However, this only applies if I/O modules are missing in the actual configuration. As soon as I/O modules are added to the I/O station, the configuration of the I/O station in the engineering software must be adapted accordingly. For example, in order to subsequently acquire or handle other and/or additional data by adding I/O modules that are not provided for in the target configuration, i.e. to process data influencing a process to be automated and/or the automation of this process, which are not provided for according to the target configuration and consequently also do not have or should not have a direct influence in terms of content and topicality on data that can be assigned to the common process according to the target configuration, either the overall configuration of the I/O station, i.e. the target configuration must be adapted or, as already shown above in general with reference to secondary data to be transmitted via a further communication channel, a system for recording this data must be set up in parallel by using an additional I/O station. Such data to be processed by subsequently adding I/O modules not provided for in the target configuration can, for example, also include further process data (such as temperatures, pulses, etc.), for example also data for troubleshooting, for predictive maintenance purposes or for machine validation/optimization, The disadvantage of the known state of the art is therefore that either the configuration of the I/O station in the engineering software as a whole must be adapted accordingly if I/O modules are subsequently added to the I/O station for the acquisition and/or processing of other and/or additional data. I.e., in order to be able to subsequently process other and/or additional data, in particular to be able to acquire process data that is to be acquired by adding I/O modules but was not previously provided in the target configuration, the project planning of the I/O station as a whole, i.e. the target configuration, must be adapted.

Or, in the case of subsequently added I/O modules, there is the further possibility of providing an additional I/O station for these, which is operated in parallel to the already existing I/O station, and of setting up a separate system for recording this data with this additional I/O station. In this case, however, two I/O stations must be operated and maintained in parallel and independently of each other.

SUMMARY

The invention is based on the task of demonstrating an improved way, in particular a way that is considerably simpler than the prior art, with which I/O modules connected to an I/O station can be integrated into a data transmission, i.e., in particular, can be correctly integrated into a data transmission provided when operating the I/O station, in particular, I/O modules that are not previously provided in a target configuration provided for operating the I/O station can be added subsequently without intervention in the target configuration and can nevertheless be integrated into the data transmission.

The above technical problem is solved with a method according to claim 1, with a station head having the features of claim 5 and with a system according to claim 10. Expedient further developments are the subject of the respective subclaims.

Accordingly, a method is provided according to the invention for integrating into a data transmission a number of I/O modules connected to an I/O station according to a configuration for processing data, in particular process data, which can be assigned according to this configuration. The I/O station thus already contains a number of I/O modules which, in practical implementation are set up according to configuration to process data which can be received from or output to respectively specific connected field devices. In practical implementation, this data thus expediently comprises data to be transmitted cyclically as a rule and, if necessary, also data to be transmitted acyclically.

In a first step, an integration mode can then be activated, whereby by activating the integration mode, or after its activation, the number of I/O modules connected to the I/O station is analyzed with regard to their configuration at the I/O station and it is also checked whether a target configuration for connecting a number of I/O modules to the I/O station for processing data that can be assigned according to this target configuration, in particular primary data, is stored in a memory. If such a target configuration is stored, a check is made in response to the target configuration stored in the memory to determine whether the target configuration can be found on the basis of the number of connected I/O modules. If the target configuration can be found, in a subsequent step, i.e. after the number of connected I/O modules has been analyzed and in response to the finding of the target configuration, each I/O module identified as required for finding the target configuration is assigned to the target configuration and each I/O module identified as not required for finding the target configuration is assigned to a new configuration for processing data that can be assigned according to this new configuration. The data to be processed according to the target configuration thus preferably corresponds to primary data, which is processed by means of the number of I/O modules connected according to the target configuration. The data to be assigned to the I/O modules according to the new configuration thus preferably corresponds to secondary data. The data, i.e. data generally associated with a respective process and to be transmitted cyclically, in particular process data and/or if necessary also data to be transmitted acyclically, including if necessary also process data to be transmitted acyclically, can be identified here in particular on the basis of the transmitting and receiving I/O modules and assigned to the respective configuration, in particular in order to be identified as primary data and secondary data thus in each case individually and assigned separately from one another to the respective configuration. It should be noted that the analysis of the I/O modules connected to the I/O station with regard to their configuration generally also includes the analysis of the respective types of I/O modules, just as a target configuration or reconfiguration then also includes or defines certain types of I/O modules.

In response to such an assignment to the new configuration, the I/O station can then be operated with each I/O module assigned to the target configuration in accordance with the target configuration, in particular exclusively in accordance with the target configuration, and furthermore the I/O station can be operated with each I/O module assigned to the new configuration independently of and/or in addition to the target configuration in accordance with the new configuration, in particular exclusively in accordance with the new configuration, in particular for processing data that can be assigned in accordance with this new configuration independently of the target configuration.

The data assigned to a respective configuration, i.e. in particular the primary data and secondary data, can consequently be processed, i.e. in particular used, independently of one another and/or in addition to one another within the I/O station. As an alternative or supplement to the respective process data to be transmitted cyclically in particular, it is also expedient to exchange further data related thereto, in particular acyclical data.

Consequently, in an advantageous manner, a simple subsequent addition of I/O modules for processing data to be added according to a further, supplementary or new configuration, i.e. in particular secondary data, is also possible without having to intervene in the target configuration.

The data added to the new configuration, i.e. in particular secondary data, is thus advantageously available for further processing without influencing the content and topicality of the data processed by the I/O modules already present according to a target configuration, i.e. in particular without influencing the content and topicality of primary data.

Furthermore, the above task is solved by a station head for an I/O station, which has a number of I/O modules connected to the I/O station according to a configuration for processing data that can be assigned according to this configuration. The station head is arranged to be operable in an integration mode. When operating in the integration mode, the station head is set up to analyze the number of I/O modules connected to the I/O station with regard to their configuration at the I/O station and to check whether a target configuration for connecting a number of I/O modules to the I/O station for processing data, in particular primary data, that can be assigned in accordance with this target configuration is stored in a memory. In the event that such a target configuration is stored, the station head is furthermore set up, when operating in integration mode, to check, in response to such a target configuration stored in the memory, whether the target configuration can be found on the basis of the number of I/O modules. In the event that the target configuration can be found, the station head, when operating in the integration mode, is further set up, after analyzing the number of I/O modules and in response to finding the target configuration, to assign each I/O module identified as required for finding the target configuration to the target configuration and to assign each I/O module identified as not required for finding the target configuration to a new configuration for processing data, i.e. in particular secondary data, which can be assigned in accordance with this new configuration. In the event that such assignment to the new configuration can take place, the station head is set up, in response to the assignment to the new configuration, to enable operation of the I/O station with each I/O module assigned to the target configuration in accordance with the target configuration, in particular exclusively in accordance with the target configuration, and to enable the I/O station to be operated with each I/O module assigned to the new configuration independently of and/or in addition to the target configuration in accordance with the new configuration, in particular exclusively in accordance with the new configuration, in particular for processing data which can be assigned in accordance with this new configuration independently of the target configuration.

Thus, also by means of the station head according to the invention, a subsequent addition of I/O modules for the processing of data, in particular for the processing of secondary process data, is possible in an advantageous manner without having to intervene in the target configuration. The station head according to the invention can thus preferably be used for carrying out the method according to the invention, i.e. can be used or can preferably be used for integration into a data transmission of a number of I/O modules connected to an I/O station according to a configuration for processing data which can be assigned according to this configuration.

The above-mentioned task is further solved by a system with the station head according to the solution of the invention, with such an I/O station and a memory, wherein the memory, depending on the specific embodiment of the system, can be integrated in the station head, can be a component of a first device superimposed on the I/O station, or hereinafter also referred to as superordinate, and being couplable to the station head, in particular a superordinate automation device, e.g. a programmable logic controller "PLC".

Preferably, the method is further characterized in that a data link for operating the I/O station with each I/O module assigned to the target configuration according to the target configuration and a first device superimposed on or superordinate to the I/O station and coupled thereto is effected independently of a data link between the I/O station and this or a further device superimposed on and coupled to the I/O station for operating the I/O station with each I/O module assigned to the new configuration according to the target configuration.

In an advantageous manner, independent data links are thus provided for transmitting in particular primary data and for transmitting in particular secondary data to the respective coupled devices, so that suitable, in particular different, communication channels can preferably also be used for the data assigned to a respective configuration, and thus in particular also suitable, in particular different, protocols can be used. The different communication channels can be designed as physically different or separate communication channels and/or as logically different or separate communication channels.

In particular for this purpose it is further provided that for the operation of the I/O station the data that can be assigned according to the target configuration, i.e. in particular the primary data, are embedded for processing within a first data structure and the data that can be assigned according to the new configuration, i.e. in particular the secondary data, are embedded for processing within a second data structure.

In particular for practical implementation in this respect, the station head in preferred further development comprises operating means for communicating via a plurality of communication channels, i.e. via a plurality of physically and/or logically separate communication channels, and for operating the I/O station with each I/O module assigned to the target configuration in accordance with the target configuration is set up to effect the data link between each I/O module assigned to the target configuration and a first device, which is superimposed on the I/O station and can be coupled to the station head, via these communication channels. The device may, for example, take the form of a programmable logic controller. In a supplementary or alternative further preferred embodiment, the station head is furthermore set up for operating the I/O station with each I/O module assigned to the new configuration in accordance with the target configuration, to effect the data link between each I/O module assigned to the new configuration and this first device or a further device superimposed on the I/O station and couplable to the station head via these communication channels.

Such a further device connected to the station head can, for example, be designed as a cloud storage device. These preferred embodiments thus expediently allow the first device to exchange and/or communicate data with the I/O modules of the target configuration and the second device to exchange data with the I/O modules of the new configuration. Advantageously, however, it is also possible within the scope of the invention to provide operating means for communicating with the at least one higher-level device via several, merely logically separate communication channels, so that the data transmission between the I/O station and the at least one higher-level device of data assignable to the target configuration and data assignable to the new configuration takes place in each case via merely logically separate communication channels.

In particular, it is intended to provide operating means so that in each case the internal data transmission between the station head and the respective I/O modules can take place in each case via a common bus, in particular backplane bus, via logically separate communication channels and/or corresponding addressing. Consequently, the operating means expediently comprise a type of communication switch, for coupling two, physically or logically externally routed communication channels and one common internal communication bus.

Furthermore, in a further preferred further development, it can be provided that the station head is equipped with an interface for coupling the first device by means of a first and/or second of these communication channels and/or with an interface for coupling the further device by means of the second of these communication channels.

In a further preferred embodiment, it is further provided with respect to the method and/or to the station head in the event that no target configuration is stored in the memory, in response to the fact that no target configuration is stored in the memory, to store in the memory a configuration identified after analysis of the number of I/O modules connected to the I/O station with regard to their configuration as a target configuration for connecting a number of I/O modules to the I/O station for processing data which can be assigned in accordance with this target configuration, in which case the method and/or the station head are furthermore set up in particular to enable operation of the I/O station with each I/O module assigned to the target configuration in accordance with the target configuration.

Supplementary or alternatively, with respect to the method and/or to the station head during operation in the inclusion mode, in the event that no target configuration can be found, it is further provided, after analysis of the number of I/O modules and in response to the fact that the target configuration cannot be found, either to output an error signal and, in this case, furthermore in particular furthermore, not to enable operation of the I/O station, or for checking whether an operable subset of the target configuration can be found on the basis of the analyzed number of connected I/O modules, wherein, in response to finding such a subset, the assignment of each I/O module of the target configuration identified as required for finding the subset of the target configuration is continued, and, in response to finding no such subset, for outputting an error signal.

In addition or alternatively, with respect to the method and/or to the station head, in the event that no assignment of a single I/O module to the new configuration has been made, it is further provided that, in response to the fact that no assignment to the new configuration has been made, it is possible to operate the I/O station with any I/O module assigned to the target configuration in accordance with the target configuration.

In a further, preferred, but equally complementary or alternative embodiment, the station head is further provided with an activation device for activating the integration mode.

In an advantageous manner, the integration mode can be selected, for example, manually by the operator.

Complementarily or alternatively, the activation device can further be mechanically designed, preferably as a mechanical switching or rotary encoding device. In a preferred embodiment, the rotary encoding device may be arranged on the station head. In addition or alternatively, however, the activation device can also be of digital design, preferably operable via a user interface that can be displayed on a website. This advantageous design of the activation device allows it to be integrated into existing user interfaces in a particularly user-friendly manner. In addition or alternatively, however, the activation device can also be coupled to a service interface on the station head for operation and/or can be operated by means of a password via a standard interface on the station head. This design form of the activation device ensures that only authorized users may access the method according to the invention directly or via an interface according to the invention.

BRIEF DESCRIPTION OF THE DRAWINGS

The invention is explained in more detail below with reference to some preferred embodiments in conjunction with the accompanying drawings, from which still further features and advantages of the invention will be apparent. Showing.

DETAILED DESCRIPTION

Figure 1:
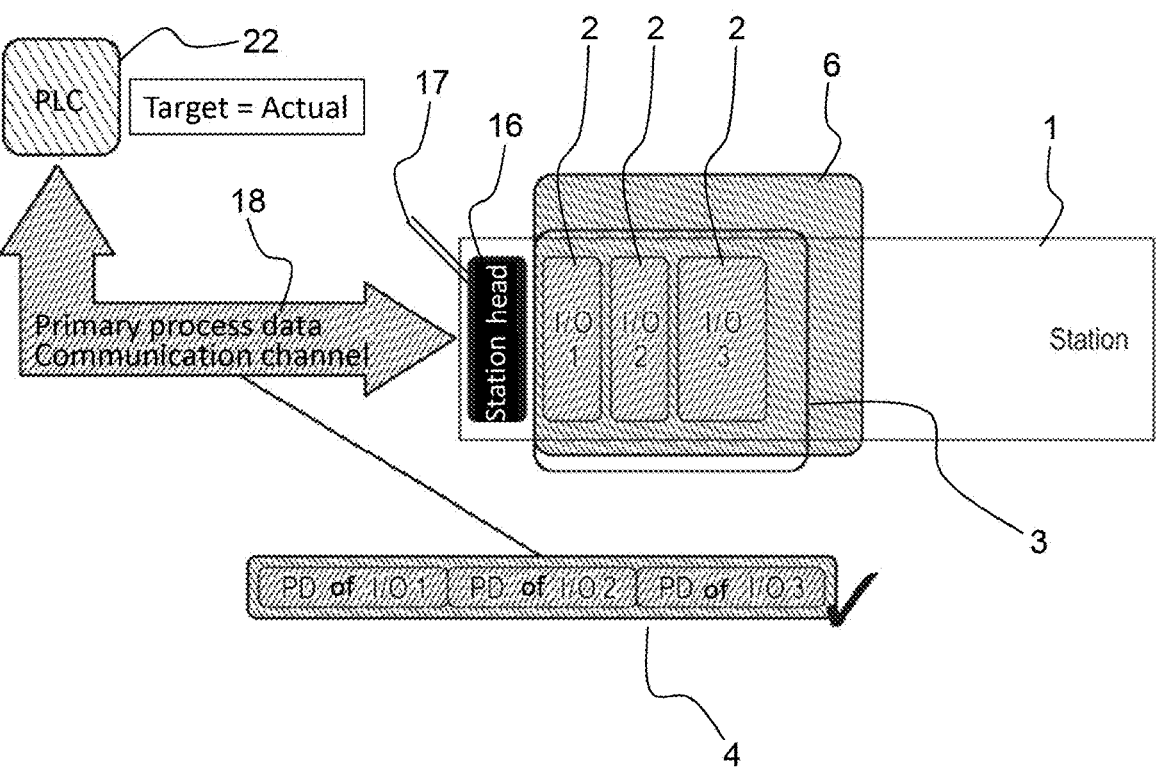
FIG. 1 for carrying out methods according to the invention, a first embodiment of an I/O station integrated into a system, in particular an automation system for process control, with a station head set up according to the invention.

In the following, the present invention, which can be used in particular with industrial bus systems such as Profinet RT (Real Time) and Profinet IRT (Isochronous Real Time), in principle also with any other bus systems that can be used as a communication bus, such as Profibus, or also with Ethernet-based communication or data transmission systems, in particular in the field of (process) automation technology, e.g. with Industrial Ethernet, is described in more detail on the basis of preferred examples of embodiment.

For this purpose, the figures show preferred embodiments of an I/O station 1 integrated into a system, in particular an automation system for process control, with a station head 16 set up in accordance with the invention, specifically for carrying out methods in accordance with the invention for integrating a number of I/O modules connected to the I/O station 1 in accordance with a configuration 3 (FIG. 1) or 3' (FIG. 2) for processing data, in particular process data, which can be assigned in accordance with this configuration, into a data transmission, wherein, after activation of an integration mode, the number of I/O modules connected to the I/O station 1 are analyzed with regard to their configuration at the I/O station, and it is checked whether a target configuration 6 for connecting a number of I/O modules 2 to the I/O station 1 for processing data 4, in particular primary data, which can be assigned in accordance with this target configuration 6, is stored in a memory, in response to a target configuration 6 stored in the memory, it is checked whether the target configuration 6 can be found on the basis of the number of I/O modules 2, after analysis of the number of I/O modules and in response to the finding of the target configuration 6, each I/O module 2 identified for finding the target configuration 6 as being required for this purpose is assigned to the target configuration 6, and each I/O module 8 identified for finding the target configuration 6 as not being required for this purpose is assigned to a new configuration 14 for processing data 10, in particular secondary data, which can be assigned in accordance with this new configuration 14, and in response to the assignment to the new configuration 14, the I/O station 1 can be operated with each I/O module 2 assigned to the target configuration 6 in accordance with the target configuration 6, and furthermore the I/O station 1 can be operated with each I/O module 8 assigned to the new configuration 14 independently of and/or in addition to the target configuration 6 in accordance with the new configuration 14.

In this regard, it should be emphasized once again that in practical implementation the respective data that can be assigned to an actual, target and new configuration generally comprises data to be transmitted cyclically, in particular process data, and if necessary also data to be transmitted acyclically. Alternatively or in addition to the respective process data to be transmitted cyclically in particular, further data associated therewith, in particular acyclic data, such as diagnostic data, can also be exchanged as appropriate.

Such data which can be assigned to a common process and are to be exchanged with at least one superordinate device, in particular automation device provided for its automation, can further be referred to as primary data within the scope of the invention according to definition if these data and/or their processing can directly influence each other with regard to content and the topicality. Data to be transmitted in parallel thereto and assigned to the same process but also to another process for further processing independently and without direct influence on the content and the topicality of the primary data can therefore hereinafter, within the scope of the invention, further be referred to by definition as secondary data.

Furthermore, it should be pointed out that the analysis of the I/O modules connected to the I/O station with regard to their configuration usually also includes the analysis of the respective types of I/O modules, just as a target configuration or new configuration then also includes or defines certain types of I/O modules.

Figure 2:
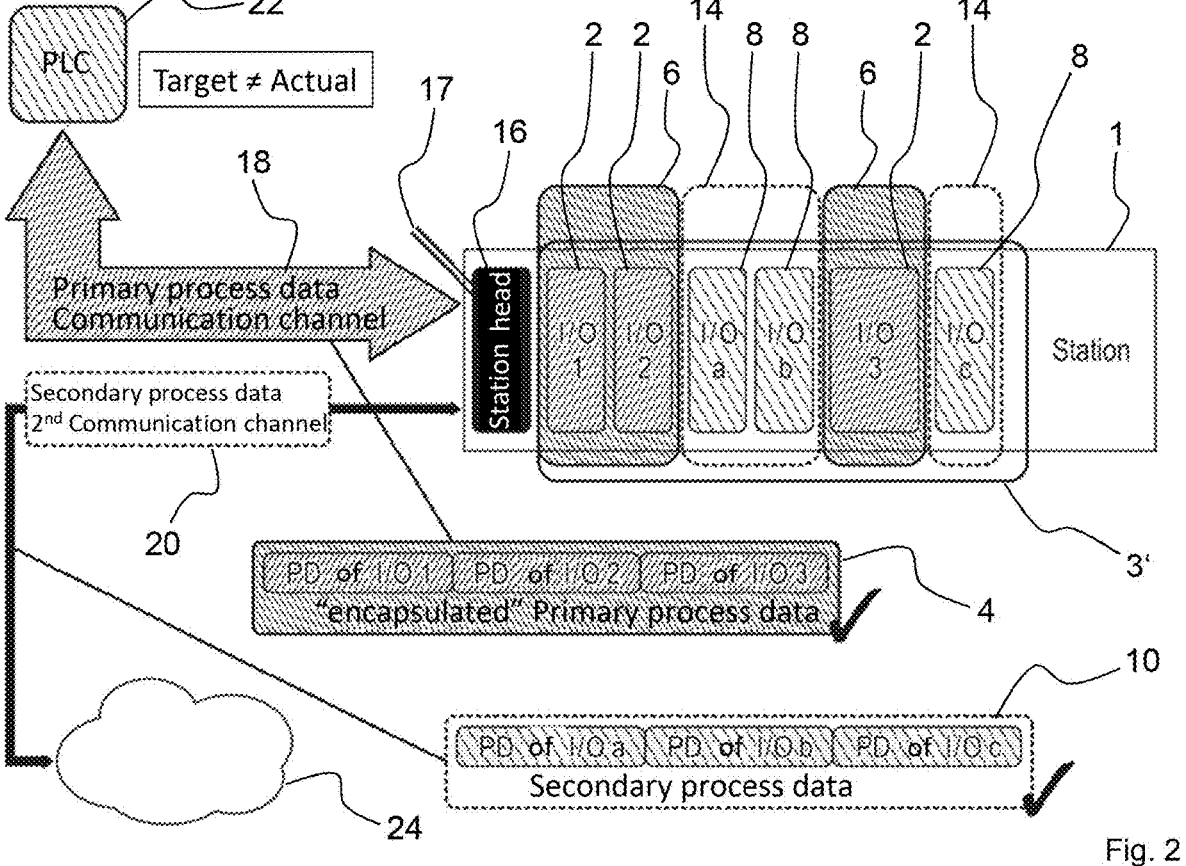
FIG. 2 a second embodiment of an I/O station integrated into a system, in particular an automation system for process control, with a station head set up according to the invention for carrying out methods according to the invention.

Specifically, in FIG. 1, I/O station 1 is shown with a number of I/O modules I/O 1, I/O 2, I/O 3 connected to I/O station 1 according to a configuration 3, for processing data assignable according to this configuration. In FIG. 2, I/O station 1 is shown with a number of I/O modules I/O 1, I/O 2, I/O a, I/O b, I/O 3, I/O c connected to I/O station 1 according to a configuration 3' for processing data assignable according to this configuration.

Furthermore, FIGS. 1 and 2 each show the station head 16 for such an I/O station 1. Conventionally, such a station head 16 is in particular part of such an I/O station 1 and usually ensures communication with a device 22, in particular an automation device, which is superordinate to the I/O station, such as a PLC as device 22, for data transmission between the latter and the I/O modules.

For this communication and in particular for the associated forwarding of data processed or to be processed by the I/O modules, i.e. in particular for forwarding the data coming from the I/O modules 2 according to configuration 3 or the data directed to the I/O modules, the station head 16 is preferably set up here in the form of a bus coupler or a decentralized controller.

In practical implementation, various field devices of a plant, which are not shown for reasons of clarity, are connected purposefully to the I/O modules, i.e. according to FIG. 1 to the I/O modules I/O 1, I/O 2, I/O 3, or also according to FIG. 2 to the I/O modules I/O 1, I/O 2, I/O a, I/O b, I/O 3, I/O c, whereby the interconnection of the I/O modules within the I/O station usually takes place first via the so-called backplane bus, which is also not shown for reasons of clarity. The backplane bus of the I/O station is then in turn connected externally in terms of data via the station head 16, via a communication channel 18, in particular of a bus system, to the higher-level device 22. According to the invention, the station head 16 itself is set up to be able to be operated in an integration mode. In practical terms, the integration mode serves, as described in more detail below, to integrate the number of I/O modules connected to the I/O station 1 in accordance with configuration 3 or 3' into a data transmission for processing data that can be assigned in accordance with this configuration.

After activation of the integration mode, and thus in particular when the station head 16 is operated in the integration mode, the number of I/O modules connected to the I/O station 1 is analyzed with regard to their configuration 3 or 3' at the I/O station 1, and it is checked whether a target configuration 6 for connecting a number of I/O modules 2 to the I/O station 1 for processing data 4 assignable according to this target configuration 6 is stored in a memory.

In the context of the invention, the integration mode is therefore also intended in particular for first checking whether a configuration has already been stored that is to be protected together with the data that can be assigned to this configuration, that is, to encapsulate, so to speak, so that, after integration of the I/O modules connected to the I/O station into the data transmission, all data that can be assigned to this configuration to be protected can be processed as primary data and data relating to I/O modules that do not belong to this configuration to be protected, i.e. that are or have been subsequently added to the I/O station after storage of such a configuration to be protected, can be processed as secondary data.

Such a memory, in which such a target configuration 6 can be stored, can in particular be integrated directly in the station head 16 or be a component of a device that is superimposed on the I/O station 1 and can be coupled to the station head 16, e.g. according to the example of embodiment in FIG. 1, the superordinate device 22. If the memory is thus e.g. a component of the superordinate device 22, a coupling with the device 22 for data exchange must also first be carried out in order to check whether a target configuration 6 is stored. Such a device 22 consequently preferably corresponds to an automation device which is to control a process according to the target configuration. For reasons of clarity, however, the memory itself is not shown in the figures.

If the check reveals that such a target configuration 6 is stored in the memory, the station head 16 is further expediently set up during operation in the integration mode to check whether this target configuration 6 can be found on the basis of the number of I/O modules according to configuration 3 or 3'. It is assumed that this is the case, for example, in the embodiment example according to FIG. 1, but also in the embodiment example according to FIG. 2, i.e. the I/O modules I/O 1, I/O2 and I/O3 additionally marked with the reference sign 2 in the figures basically correspond in their special configuration to the target configuration 6.

As already explained above, such an analysis usually also includes the analysis of the respective types of I/O modules. Consequently, the target configuration also includes or defines the types of I/O modules intended for this purpose, i.e. specific types.

Thus, if the check after analyzing the number of I/O modules shows that such a target configuration 6 can be found on the basis of the number of I/O modules according to configuration 3 or 3', the station head 16, when operating in the integration mode, is further expediently set up to thereupon assign each I/O module identified as required for finding the target configuration 6 to the target configuration 6, i.e. according to FIG. 1 all I/O modules connected according to configuration 3 or according to FIG. 2 the I/O modules connected according to configuration 3' which are additionally marked with reference sign 2. Each further I/O module identified for finding the target configuration as not required for this purpose is furthermore assigned to a new configuration 14 for processing data 10 that can be assigned according to this new configuration, i.e. according to FIG. 2 the I/O modules connected according to configuration 3' that are additionally marked with the reference sign 8.

If such an assignment of I/O modules to the new configuration 14 has been made, the station head 16 is thus expediently further set up to enable the operation of the I/O station according to the target configuration 6, namely with each I/O module 2 assigned to the target configuration 6, i.e. taking into account these I/O modules, in particular exclusively taking into account these I/O modules 2, and on the other hand to enable operation of the I/O station in accordance with the new configuration 14, namely with each I/O module 8 assigned to the new configuration 14, i.e. taking into account these I/O modules 8, in particular exclusively taking into account these I/O modules 8.

The operation of the I/O station according to the target configuration 6 and the operation of the I/O station according to the new configuration 14 can here, in particular depending on the special embodiment, preferably be enabled complementarily, i.e. in particular in parallel with each other, or also alternatively, but in particular independently of each other, be enabled and thus take place thereupon.

Furthermore, each I/O module 2 assigned to the target configuration 6 is preferably considered or released exclusively for the operation of the I/O station according to the target configuration 6 and each I/O module 8 assigned to the new configuration 14 is considered or released exclusively for the operation of the I/O station according to the new configuration 14.

In particular, to enable such supplementary and/or alternative operation of the I/O station, the station head 16 further expediently provides operating means for communicating via at least two communication channels 18 and 20, which in practical implementation may comprise hardware and/or software components. However, since the skilled person is familiar with operating means for transmitting, distributing and processing information that are basically made up of hardware and/or software components, these are not shown further in the figures for the sake of clarity.

According to the embodiment examples shown in the figures, however, it is provided in this case in particular to effect via a first communication channel, e.g. via the communication channel 18, for operating the I/O station 1 with each I/O module 2 assigned to the target configuration 6 according to the target configuration 6, the data link between each I/O module 2 assigned to the target configuration and a first device which is superimposed on the I/O station 1 and can be coupled to the station head 16, i.e. according to the embodiment examples shown in the figures, the device 22.

Via a second communication channel, according to the embodiments illustrated in the figures, for example via the communication channel 20, the data link between each I/O module 8 assigned to the new configuration and a second device superimposed on the I/O station 1 and couplable to the station head 16, i.e. according to the embodiments illustrated in the figures, the device 24, is or can be effected in this case for operating the I/O station 1 with each I/O module 8 assigned to the new configuration 14 according to the new configuration 6.

It should further be noted that in FIG. 2, these at least two communication channels 18 and 20 are admittedly shown as physically different or separate communication channels. However, within the scope of the invention, the at least two communication channels can also be designed as logically different or separate communication channels in a supplementary or alternative manner, as already explained above.

In a preferred embodiment, the second communication channel 20, via which the data link for transmitting the data 10, in particular secondary data, of the I/O modules 8 of the reconfiguration between the station head 16 and a device 24 that can be coupled to the station head 16, for example a cloud, a software tool, a database or a mobile terminal, can be operated completely independently of the first communication channel 18.

The internal data transmission between the station head 16 and the respective I/O modules can then suitably take place in each case via the common backplane bus, via logically separate communication channels and/or corresponding addressing of the I/O modules.

The operating means provided with the station head thus expediently comprise a type of communication switch for coupling several communication channels 18, 20, which are physically or logically routed to the outside, and the common internal communication bus, i.e. in particular the common backplane bus. Furthermore, in particular in the case of communication channels 18, 20 that are only logically routed separately to the outside, i.e. if both communication channels 18, 20 are routed via a common physical medium, in a modification to FIG. 2, a data link can also be operated via the second communication channel between each I/O module assigned to the new configuration and the first device 22 separately from the data link operated with respect to the I/O module assigned to the target configuration. In this case, for example, the further processing of primary data and secondary data can also be carried out separately but by the common device, 22 or the processing of the primary data or secondary data can be handed over by the device 22 to a further data processing device connected to it and not shown in the figures.

For coupling the first, higher-level device 22 by means of the first of one and/or also second of these communication channels 18, 20 and/or for coupling the second device, in particular by means of the second communication channel 20, the station head 16 is thus expediently set up with respective interface, which, however, is likewise not shown in more detail in the figures for reasons of clarity. Such a respective interface can in particular be set up for coupling by means of one communication channel or several communication channels, in particular on the basis of a field bus, such as Profibus, and/or Industrial Ethernet.

The data, in particular primary data, according to target configuration 6, i.e. in particular process data PD and here in particular primary process data, therefore also referred to as primary process data in the figures, can thus subsequently be exchanged between the station head 16 and the first higher-level device 22 via the first communication channel 18 according to illustrated embodiments. The data, in particular secondary data, according to reconfiguration 14, i.e. in particular process data PD and here in particular secondary process data, in FIG. 2 therefore also referred to as secondary process data, can thus be exchanged in sequence according to illustrated embodiments via the second communication channel 20 between the station head 16 and the second higher-level device 24.

As is additionally evident from the description of the preferred embodiments shown in FIGS. 1 and 2, an essential improvement by application of the invention is that a simple subsequent addition of I/O modules, in particular for the processing of secondary data, can be carried out without interfering with the engineering of the original target configuration. The target configuration and thus an actual configuration found again in this respect remain the same for the engineering, in particular therefore of a primary process, and thus remain valid. Additional secondary data to be processed, in particular according to a further included "new configuration", are thus available for further processing independently, in particular via a separate communication channel and without influence on the content and the topicality of the primary data. The making available of these secondary data happens furthermore expediently over a separate suitable communication channel, over which the secondary data are used depending upon use for example in a Cloud, from a tool, in a data base and/or from a mobile terminal, to give possible examples of a second superordinate equipment 24 or also of a possible further data processing equipment connected with the first equipment according to above described modification to FIG. 2.

For example, OPC UA or an open network protocol for "machine-to-machine" communication, which in particular also enables the transmission of telemetry data in the form of messages between devices, such as MQTT ("Message Queuing Telemetry Transport"), can also be used for a further separate suitable communication channel 20 for this purpose, for which the secondary data can be made available according to the invention.

For activating the integration mode, an activation device 17 is expediently further associated with the station head 16. Preferably, the station head is equipped with an activation device 17 according to the invention, which is designed as a mechanical device, preferably as a mechanical switching or rotary coding device, whereby a digital design can also be provided as a supplement or alternative. In a particularly preferred embodiment, the activation device 17 can also be additionally or alternatively coupled to a service interface on the station head for operation and/or can be operated by means of a password via a standard interface on the station head.

According to the invention, with reference to FIGS. 1 and 2, the following is further preferably provided:

If the check as to whether a target configuration 6 is already stored in the memory shows that no such target configuration 6 is stored in the memory, the embodiment according to the invention is expediently further developed in such a way that the configuration identified after the analysis of the number of I/O modules connected to the I/O station 1 with regard to their configuration, i.e. the actual configuration in this case, according to FIG. 1, this would thus be the configuration 3, is stored in the memory as a target configuration 6 for connecting a number of I/O modules to the I/O station for processing data 4 which can be assigned in accordance with this target configuration 6, and in this case initially only operation of the I/O station with each of the I/O modules 2 assigned to this target configuration 6 is enabled in accordance with the target configuration.

If the search for I/O modules connected in accordance with a configuration, after their analysis, on the basis of which a stored desired configuration 6 can be found, shows that the stored desired configuration 6 cannot be found, the embodiment according to the invention is expediently further designed in a supplementary or alternative manner in such a way that either an error signal can be output and further expediently designed in this case not to enable operation of the I/O station 1. Alternatively, however, in the event that the stored desired configuration 6 cannot be found, the embodiment according to the invention can also be suitably further embodied in a modification for carrying out a check by the station head or by the device 22, in which case it is checked whether an operable subset of the target configuration can be found on the basis of the analyzed number of connected I/O modules. In response to the finding of such a subset, it is then advantageously possible to nevertheless proceed with the assignment of each I/O module 2 of the target configuration 6 identified as being required for this purpose for finding the subset of the target configuration 6, and in response to the finding of no such subset, an error signal can again be output.

In addition or alternatively, the embodiment according to the invention is expediently further designed in such a way that, if an assignment to a new configuration 14 cannot be made, in particular due to a lack of further I/O modules, it is nevertheless possible to operate the I/O station 1 with each I/O module 2 assigned to the target configuration 6 in accordance with the target configuration 6.

In summary, the I/O modules connected according to a configuration are first analyzed according to their actual configuration, in particular also for identifying and potentially separating data that can be assigned to them in each case, for example to separate primary data from secondary data, and are then preferably also identified. The target configuration is either specified by a superimposed device 22, such as a PLC, or corresponds to the actual configuration, which then becomes the target configuration when the integration mode is activated. The I/O modules connected in accordance with a target configuration and the data assigned to them can thus be quasi "encapsulated" in accordance with the invention, in particular encapsulated as primary data to be communicated and processed, i.e. protected as such in particular. In other words, the following data identified as primary data is in particular the data, and in particular the process data, of those I/O modules which are described in the target configuration, but alternatively or additionally also further data, in particular acyclic data, which may be associated with this.

"Encapsulation" is a significant innovation, especially for the separation or assignment of primary and secondary data.

If "encapsulation" is desired, then when the described integration mode is activated, all data relating to subsequently added I/O modules can also be assigned to the secondary data. Consequently, one or more I/O modules can be added to an I/O station in a simple manner without having to intervene in the engineering of the original target configuration. In other words, in particular after the I/O modules connected to the I/O station 1 have been integrated in the data transmission according to the above description in accordance with the invention, the adapted structure of the data for their communication with higher-level devices can then be generated according to the order of the I/O modules in the station, as shown in particular in FIG. 2.

In practical implementation, the station head ensures that the addition and removal of further I/O modules does not affect the primary data in terms of content and topicality and therefore has no influence on the running application in a primary controller, e.g. device 22. Furthermore, in practical implementation, the station head can reorganize the structure of the secondary data accordingly when I/O modules are added or removed.

When the integration mode is activated, which can thus also be referred to as a type of "encapsulated" mode, the station head conveniently compares any projected target configuration with the actual configuration.

If a difference is detected, there are in a preferred embodiment several possibilities how to react, in particular the station head reacts.

For example, an error is detected if the target configuration cannot be found in the actual configuration and in this case it can be assumed, for example, that the configuration according to which the I/O modules are connected is in no way desired by the user.

Furthermore, however, it can also be detected that no error is present, in particular, a) if a "special" module (quasi as a placeholder) is contained within the target configuration and not at the end of the station, this has been exchanged for another module, and/or between I/O modules according to the target configuration another one has been inserted, like e.g. at FIG. 2 the I/O modules I/O a and I/O b, whereby the data, e.g. process data of the added I/O module can then be assigned to the secondary data, e.g. the secondary process data;

b) if the target and actual configurations differ in such a way that I/O modules have been added at the end of the station, e.g. the I/O module I/O c in FIG. 2;

c) if the target and actual configurations match;

d) if the target and actual configurations differ in such a way that one or more I/O modules of the target configuration are missing in the actual configuration, but an operable subset of the target configuration can be found.

Thus, in order to be able to use the function described above, an integration mode is activated as described, i.e., in particular, an extended mode of operation "encapsulated", and this activation can take place via a plurality of mechanisms, for example a. via a mechanical device, e.g. a rotary coding switch on the station head, b. via a button on the station head website,

c. via a service interface on the station head, i.e. via a password of the standard interface.

When this integration mode is activated and therefore in operation, a respective stored target configuration is "encapsulated" or, an actual configuration is initially stored in a useful embodiment as a target configuration, which can then be encapsulated accordingly during subsequent activation, so that this target configuration is henceforth protected against the addition of further I/Os, hardened so to speak, and the addition of further I/O modules does not necessarily result in an error message due to a deviation of the actual configuration from the target configuration. The data, in particular process data, that can be assigned to the identified and added I/O modules assigned to a new configuration 14 are thus expediently available as secondary data, i.e. in particular as secondary process data, preferably also to other functions/tasks, such as predictive maintenance, for example. The structure of the secondary data can also be visualized, for example, by a table on a web server of the station head.

In particular, it is envisaged that, after activation, automatic detection of newly added I/O modules takes place at the station head, with primary data of the I/O modules continuing to be processed encapsulated in accordance with the target configuration. After activation, an inherent mechanism, for example, in which the local bus structure is analyzed at regular intervals, detects the addition and removal of I/O modules whose data is not assigned to the primary data. The mechanism can thus ensure, in particular also in practical implementation, that the addition and removal of further I/O modules does not affect the primary data and its transmission/processing and that the structure of the secondary data is reorganized accordingly. In particular, the secondary data is thus also available to other functions/ tasks, such as predictive maintenance, whereby, as mentioned, the structure of the secondary data can also be visualized, for example, by a table on the web server of the station head.

Taking the above description into account, it can be seen that the integration mode according to the invention can thus be expediently provided as a supplement to, but also as an alternative to a mode or "standard mode" in which, during the commissioning of an I/O station, only an adjustment between a target and an actual configuration of the I/O station is carried out and the project planning of the I/O station as a whole, i.e. also the target configuration, must be adjusted if a deviation between the target and actual configuration is detected during the adjustment, at least if the deviation does not merely consist of I/O modules being missing in the actual configuration, but the I/O station can otherwise still be put into operation.

LIST OF REFERENCE SIGNS

1) I/O station
2) I/O modules according to the target configuration
3), 3') Configuration
4) Data of the target configuration
6) Target configuration
8) I/O modules according to the new configuration
10) Data of the new configuration
14) New configuration
PD Process data
16) Station head
17) Activation device
18) first communication channel
20) second communication channel

16

22) first superordinate device
24) second superordinate device

The invention claimed is:

1. A method for integration into a data transmission of a number of I/O modules connected to an I/O station according to a configuration for processing process data, which can be assigned according to this configuration, comprising the steps of:

a) activating an integration mode that is operated by a station head of the I/O station, wherein by activating the integration mode the number of I/O modules connected to the I/O station is analyzed with regard to their actual configuration at the I/O station and checking whether a predefined target configuration, which is specified by a device superordinate to the I/O station, for connecting a number of I/O modules to the I/Ostation for processing primary data, which are assigned to this target configuration, is already stored in a memory of the station head or of the superordinate device, wherein the target configuration is to be protected together with the primary data, b) wherein, in response to the checking revealing that a target configuration is stored in the memory, further checking whether the target configuration can be found in the actual configuration of the number of analyzed connected I/O modules by comparing the target configuration with the actual configuration and in response to the finding of the target configuration within the actual configuration, c) assigning each I/O module identified as required for finding the target configuration to the target configuration, assigning each I/O module identified as not required for finding the target configuration, to a new configuration for processing secondary data, which are assigned to this new configuration, d) wherein, in response to the assignment to the new configuration, operating the I/O station with each I/O module assigned to the target configuration exclusively in accordance with the target configuration, and operating the I/O station with each I/O module assigned to the new configuration independently of and/or in parallel with the target configuration exclusively in accordance with the new configuration for processing the secondary data assignable to this new configuration independently of the target configuration.

2. The method according to claim 1, wherein a data link between the I/O station and the device superordinate to the I/O station and coupled thereto, is effected for operating the I/O station with each I/O module assigned to the targetconfiguration according to the target configuration, independently of a data link between the I/O station and this or a further device which is superordinate to the I/O station and coupled thereto, for operating the I/O station with each I/O module assigned to the new configuration in accordancewith the new configuration.

3. The method according to claim 1, wherein for the operation of the I/O station, thedata assignable according to the target configuration are embedded for processing within a first data structure and the data assignable according to the new configuration are embedded for processing within a second data structure.

4. The method according to claim 1, wherein:

when operating in the integration mode, further arranging, in response to the check according to step a) which shows that no such target configuration is stored in the memory, to store in the memory a configuration identified after analysis of the number of I/O modules connected to the I/O station with regard to their actual configuration as a target configuration for connecting a number of I/O modules to the I/O station for processing data assignable in accordance with this target configuration, and operating the I/O station with each I/O module assigned to the target configuration according to the target configuration.

5. The method according to claim 1, wherein:

when operating in the integration mode, after analysis of the number of I/O modules and in response to the check according to step b) which shows that the target configuration cannot be found in the I/O station, outputting an error signal and not enabling operation of the I/O station, or checking whether an operable subset of the target configuration can be found on the basis of the analyzed number of connected I/O modules, proceeding in response to the finding of such a subset according to step c), but with the modification that each I/O module identified, as required for finding the subset of the target configuration, is assigned to the target configuration, and in response to the finding of no such subset for outputting an error signal, and/or even in response to the fact that after execution of step c) no single I/O module has been assigned to the new configuration, operating the I/O station with each I/O module assigned to the target configuration in accordance with the target configuration.

6. A station head for an I/O station with a number of I/O modules connected to the I/O station according to a configuration for processing process data, which can be assigned according to this configuration, comprising:

a bus coupler or a decentralized controller, wherein the station head is adapted to be operable in an integration mode, wherein the station head is arranged, during operation in the integration mode, to analyze the number of I/O modules connected to the I/O station with regard to their actual configuration at the I/O station and to check whether a predefined target configuration, which is specified by a first device superordinate to the I/O station, for connecting a number of I/O modules to the I/O station for processing primary data, which is assigned in accordance with this target configuration, is already stored in a memory of the station head or of the first device, wherein the target configuration is to be protected together with the primary data;

wherein the station head, when operating in the integration mode, is further arranged, in response to such a target configuration stored in the memory, to check whether the target configuration can be found in the actual configuration of the number of analyzed connected I/O modules by comparing the target configuration with the actual configuration, wherein the station head is further arranged, when operating in the integration mode after analysis of the number of connected I/O modules and in response to the finding of the target configuration, to assign each I/O module identified as required for finding the target configuration to the target configuration and each I/O module identified as not required for finding the target configuration to a new configuration to process secondary data that is assigned to this new configuration, the station head being further arranged in response to the assignment to the new configuration, for operating the I/O station with each I/O module assigned to the target configuration exclusively in accordance with the target configuration, and for operating the I/O station with each I/O module assigned to thenew configuration independently of and/or in parallel with the target configuration exclusively in accordance with the new configuration, for processing the secondary data which is assigned to this new configuration independently of the target configuration.

7. The station head according to claim 6, wherein the station head provides operating means for communicating via a plurality of communication channels and is arranged:

to effect via these communication channels a data link between each I/O module assigned to the target configuration and the first device, which is couplable to the station head, for operating the I/O station with each I/O module assigned to the target configuration in accordance with the target configuration, and to effect via these communication channels a data link between each I/O module assigned to the new configuration and this first or a further device, which is superordinate to the I/O station and couplable to the station head, for operating the I/O station with each I/O module assigned to the new configuration in accordance with the new configuration.

8. The station head according to claim 7, wherein the station head is set up with an interface for coupling the first device by means of a first and/or second of these communication channels and/or for coupling the further device by means of a second of these communication channels, including a respective interface for coupling by means of field bus including a Profibus, and/or an Industrial Ethernet.

9. The station head according to claim 6, wherein the station head, when operating in the integration mode, isfurther arranged, in response to no such target configuration being stored in the memory, to store in the memory a configuration identified after analysis of the number of I/O modules connected to the I/O station with regard to their actual configuration as a target configuration for connecting a number of I/O modules to the I/O station for processing data assignable in accordance with this target configuration, and arranged for enabling operation or for operating the I/O station with each I/O module assigned to the target configuration according to the target configuration.

10. The station head according to claim 6, wherein the station head is further arranged with an activation device for activating the integrationmode, wherein the activation device:

is designed as a mechanical switching or rotary coding device, and/or is designed digitally, and is operable viaa user interface which is displayable on a website, and/or is coupled for operation to a service interface on the station head and/or is operable by means of a password via a standard interface on the station head.

11. A system comprising the station head according to claim 6, an I/O station, and a memory, the memory beingintegrated in the station head.

12. A system comprising the station head according to claim 6, an I/O station, and the memory, the memory being part of the first device, which is superordinate to the I/O station and is couplable to the station head.

13. The station head according to claim 6, wherein the station head, when operating in integration mode after analysis of the number of I/O modules and in response thereto, that the target configuration cannot be found, either to output an error signal and make it impossible to operate the I/O station, or to check whether an operable subset of the target configuration can be found on the basis of the analyzed number of connected I/O modules, and, in response to finding such a subset, for assigning each I/O module identified as required for finding the subset of the target configuration to the target configuration, and, in response to finding no such subset, for outputting an error signal, and/or in response to no assignment being made to the new configuration, is arranged to enable the I/O station to be operated or to be operated with each I/O module assigned to the target configuration in accordance with the target configuration.

* * * * *